US006989207B2

(12) United States Patent
Austin, II et al.

(10) Patent No.: US 6,989,207 B2
(45) Date of Patent: Jan. 24, 2006

(54) ARCHITECTED FUEL CELL SYSTEM FOR MODULAR APPLICATION

(75) Inventors: Douglas G. Austin, II, Broadalbin, NY (US); Nicola Piccirillo, Scotia, NY (US); Kenneth M. Rush, Clifton Park, NY (US); Jeffrey R. Boyer, Niskayuna, NY (US); John F. Elter, Glenville, NY (US); Jeremy D. Carlson, Scotia, NY (US); Steven P. Bogardus, Ballston Lake, NY (US)

(73) Assignee: Plug Power Inc., Latham, NY (US)

( * ) Notice: Subject to any disclaimer, the term of this patent is extended or adjusted under 35 U.S.C. 154(b) by 252 days.

(21) Appl. No.: 10/264,541

(22) Filed: Oct. 7, 2002

(65) Prior Publication Data

US 2004/0067397 A1     Apr. 8, 2004

(51) Int. Cl.
   *H01M 8/04*     (2006.01)

(52) U.S. Cl. .............................. 429/13; 429/22; 429/23; 429/34

(58) Field of Classification Search .................. 429/12, 429/13, 22, 23, 24, 25, 34
See application file for complete search history.

(56) References Cited

U.S. PATENT DOCUMENTS

| | | | | |
|---|---|---|---|---|
| 5,980,726 A | * | 11/1999 | Moulthrop, Jr. et al. | .. 429/22 X |
| 6,428,918 B1 | * | 8/2002 | Fuglevand et al. | ........... 429/13 |
| 6,630,259 B2 | * | 10/2003 | Fuglevand | .................... 429/13 |
| 6,764,785 B2 | * | 7/2004 | Colborn et al. | ............... 429/23 |
| 2003/0235730 A1 | * | 12/2003 | Noetzel et al. | ............... 429/23 |

* cited by examiner

*Primary Examiner*—Stephen J. Kalafut
(74) *Attorney, Agent, or Firm*—Trop, Pruner & Hu, P.C.

(57) ABSTRACT

The invention provides apparatuses and associated methods of manufacture for fuel cell systems designed for modular application. As an example, a fuel cell system is provided that includes an enclosure housing a fuel cell stack, a power conditioning circuit, and a control circuit. The power conditioning circuit has a first input connector electrically coupled to the fuel cell stack. The power conditioning circuit is adapted to convert a direct current flow from the fuel cell stack to a conditioned alternating current flow having a predetermined voltage (e.g., 120 volts). The conditioned current flow is provided to an outlet connector of the power conditioning circuit located along a first portion of the enclosure. The power conditioning circuit further includes a second input connector located along a second portion of the enclosure. The second input connector is adapted to receive an external current flow.

34 Claims, 4 Drawing Sheets

ARCHITECTED FUEL CELL SYSTEM FOR MODULAR APPLICATION

BACKGROUND

The invention generally relates to methods and apparatus associated with fuel cell systems designed for modular application.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

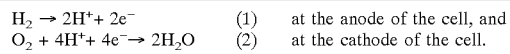

$$H_2 \rightarrow 2H^+ + 2e^- \quad (1) \quad \text{at the anode of the cell, and}$$
$$O_2 + 4H^+ + 4e^- \rightarrow 2H_2O \quad (2) \quad \text{at the cathode of the cell.}$$

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. The flow field plates are generally molded, stamped or machined from materials including carbon composites, plastics and metal alloys. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The GDL's generally comprise either a paper or cloth based on carbon fibers. The PEM and its adjacent pair of catalyst layers are often referred to as a membrane electrode assembly (MEA). An MEA sandwiched by adjacent GDL layers is often referred to as a membrane electrode unit (MEU), or also as an MEA. Common membrane materials include Nafion™, Gore Select™, sulphonated fluorocarbon polymers, and other materials such as polybenzimidazole and polyether ether ketone. Various suitable catalyst formulations are also known in the art, and are generally platinum-based.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Fuel cell systems generally include various sources of waste heat, such as from fuel processing systems, the fuel cell stack itself, exhaust gas oxidizers, etc. In particular, the exhaust from a fuel cell is generally oxidized to remove trace amounts of unreacted fuels before it is exhausted to ambient. Such exhaust is generally hot and saturated with water vapor from the fuel cell system and from combustion of combustible gas components in the exhaust. For a variety of reasons, it may be desirable to recover such waste heat from a fuel cell system. As an example, if heat from a fuel cell system can be used to replace or supplement an external system that uses fuel to produce heat (e.g., a furnace or boiler), the combined efficiency of the systems may be increased. Also, where heat is recovered from a fuel cell exhaust stream, other benefits of waste heat recovery may include the recovery of water (e.g., to be reused in the system to humidify reactants or to hydrate the fuel cell membrane), since water will condense from a saturated exhaust stream as it is cooled. It may be further desirable to manage waste heat in a fuel cell system to provide improved control over system operating temperatures, and for a variety of other reasons that will be apparent to those skilled in the art.

There is a continuing need for fuel cell systems with modular architecture to reduce the cost and improve the reliability and flexibility of manufacture, and to increase the range of applications that combinations of standard subsystem platforms can serve.

SUMMARY

The invention provides apparatuses and associated methods of manufacture for fuel cell systems designed for modular application. In one aspect, a fuel cell system is provided that includes an enclosure housing a fuel cell stack, a power conditioning circuit, and a control circuit. The power conditioning circuit has a first input connector electrically coupled to the fuel cell stack. The power conditioning circuit is adapted to convert a direct current flow from the fuel cell stack to a conditioned alternating current flow having a predetermined voltage (e.g., 120 volts). The conditioned current flow is provided to an outlet connector of the power conditioning circuit located along a first portion of the enclosure. The power conditioning circuit further includes a second input connector located along a second portion of the enclosure. The second input connector is adapted to receive an external current flow.

The control circuit is coupled to the second input connector, and is adapted to operate the power conditioning circuit in a first mode when an external current flow is received by the second input connector. The control circuit is further adapted to operate the power conditioning circuit in a second mode when an external current flow is not received by the second input connector. As examples, the first mode can include operating the power conditioning circuit to condition the current received from the second input connector, and the second mode can include electrically isolating the second input connector from the outlet connector (e.g., for safety).

The term "coupled" is used to refer to any direct or indirect connection between two elements of the system. As an example, an indirect connection of two components may include connections to various other components between them.

In some embodiments, the enclosure comprises a frame, and the second input connector and the outlet connector are each located along a portion of the frame. Additional embodiments may include an electrical load coupled to the outlet connector, and a second fuel cell system coupled to the second input connector such that power from the second fuel cell system is supplied to the electrical load. In some embodiments, the outlet connector is coupled to the second input connector in parallel with the first input connector.

In some embodiments, the controller is adapted to route current from the second input connector to the outlet connector when the current supplied to the second input connector has a predetermined voltage (e.g., indicating it does not need to be conditioned by the power conditioning circuit).

Some embodiments further include a communications bus coupled to the control circuit, wherein the communications bus has a first port and a second port (e.g., telephone or network style connectors), and the first and second ports are adapted to allow the communications bus to be placed in a daisy chain of communication busses of external fuel cell systems. As an example, the control circuit can be adapted to modulate a power output of the system according to a signal received from the communications bus.

In another aspect, a fuel cell system is provided with an enclosure housing a fuel cell stack and a power conditioning circuit. The power conditioning circuit has a first input connector, a second input connector, and an outlet connector. The first input connector is electrically coupled to the fuel cell stack. The second input connector is located along a first portion of the enclosure, and is adapted to receive an external current flow. The power conditioning circuit is adapted to convert a direct current flow from the first and second input connectors to a conditioned alternating current flow having a predetermined voltage. The conditioned current flow is provided to an outlet connector of the power conditioning circuit located along a second portion of the enclosure.

In another aspect, a fuel cell system is provided with an enclosure housing a fuel cell stack and a power conditioning circuit. The power conditioning circuit has a first input connector, a second input connector, and an outlet connector. The first input connector is electrically coupled to the fuel cell stack. The second input connector is located along a first portion of the enclosure and is adapted to receive an external current flow. The power conditioning circuit is adapted to convert a direct current flow from the first connector to a conditioned alternating current flow having a predetermined voltage. The conditioned current flow is combined with the external current flow and provided to an outlet connector of the power conditioning circuit located along a second portion of the enclosure.

In another aspect, a fuel cell system is provided with an enclosure housing a fuel cell stack and a power conditioning circuit. The power conditioning circuit is adapted to convert a direct current flow from the fuel cell stack to a conditioned alternating current flow having a predetermined voltage. The conditioned current flow is supplied to a power outlet connector located along a first portion of the enclosure, and an electrical load is coupled to the power outlet connector. The power outlet connector is coupled to a power input connector located along a second portion of the enclosure such that the conditioned current flow is supplied to the electrical load in series with an external power source coupled to the power input connector.

In some embodiments, a control circuit is coupled to a communications bus. As previously discussed, the communications bus has a first port and a second port, and the first and second ports are adapted to allow the communications bus to be placed in a daisy chain of communication busses of external fuel cell systems. In some embodiments, the control circuit is adapted to modulate a power output of the system according to a signal received from the communications bus.

In another aspect, a method is provided for operating a plurality of fuel cell systems to supply a common electrical load, including at least the following steps: (1) operating a first fuel cell stack to supply a first amount of power onto a first system power bus; (2) operating a second fuel cell stack to produce a second amount of power onto a second system power bus; (3) coupling the first and second system power buses in series to an electrical load; (4) coupling a first control circuit associated with the first fuel cell stack to a first communications bus; (5) coupling a second control circuit associated with the second fuel cell stack to a second communications bus; (6) coupling the first and second communications busses in series to an external communication line; and (7) operating each of the first and second control circuits independently according to an external control circuit communicating via the external communications line.

Various embodiments of such methods may further incorporate any of the features an techniques discussed herein, either alone or in combination.

Advantages and other features of the invention will become apparent from the following description, drawing and claims. It will be appreciated that various embodiments of the invention can include any of the features, aspects, and steps discussed herein, either alone or in combination.

DETAILED DESCRIPTION

Figure 1:
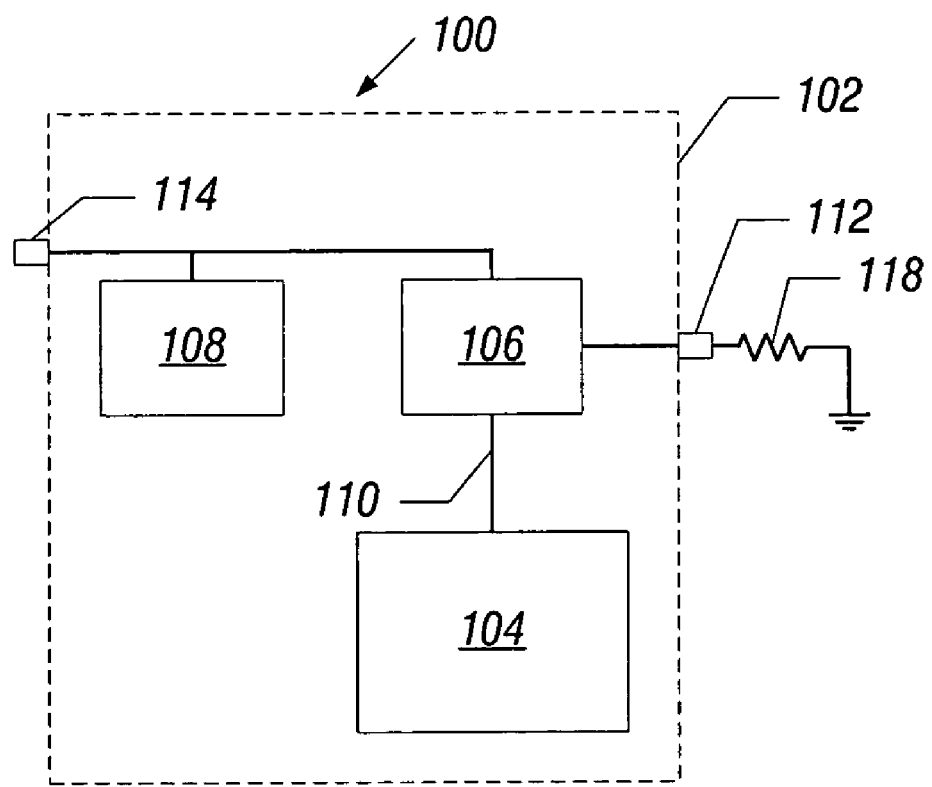
FIG. 1 shows a schematic diagram of a fuel cell system according to an embodiment of the present invention.

Referring to FIG. 1, a schematic diagram is shown of a fuel cell system 100 according to an embodiment of the present invention. An enclosure 102 houses a fuel cell stack 104, a power conditioning circuit 108, and a control circuit 106. The power conditioning circuit 106 has a first input connector 110 electrically coupled to the fuel cell stack 104. The power conditioning circuit 106 is adapted to convert a direct current flow from the fuel cell stack 104 to a conditioned alternating current flow having a predetermined voltage (e.g., 110–120 volts, or at utility grid specifications). The conditioned current flow is provided to an outlet connector 112 of the power conditioning 106 circuit located along a first portion of the enclosure 102. The power conditioning circuit 106 further includes a second input connector 114 located along a second portion of the enclosure 102. The second input connector 114 is adapted to receive an external current flow (e.g., from another system connected in series to system 100).

The control circuit 108 is coupled to the second input connector 114, and is adapted to operate the power conditioning circuit 106 in a first mode when an external current flow is received by the second input connector 114. The control circuit 108 is further adapted to operate the power conditioning circuit 106 in a second mode when an external current flow is not received by the second input connector 114. As examples, the first mode can include operating the power conditioning circuit 106 to condition the current received from the second input connector 114, and the second mode can include electrically isolating the second input connector 114 from the outlet connector 112 (e.g., so that the connector 114 does not receive a potential from the current output from connector 112).

Figure 2:
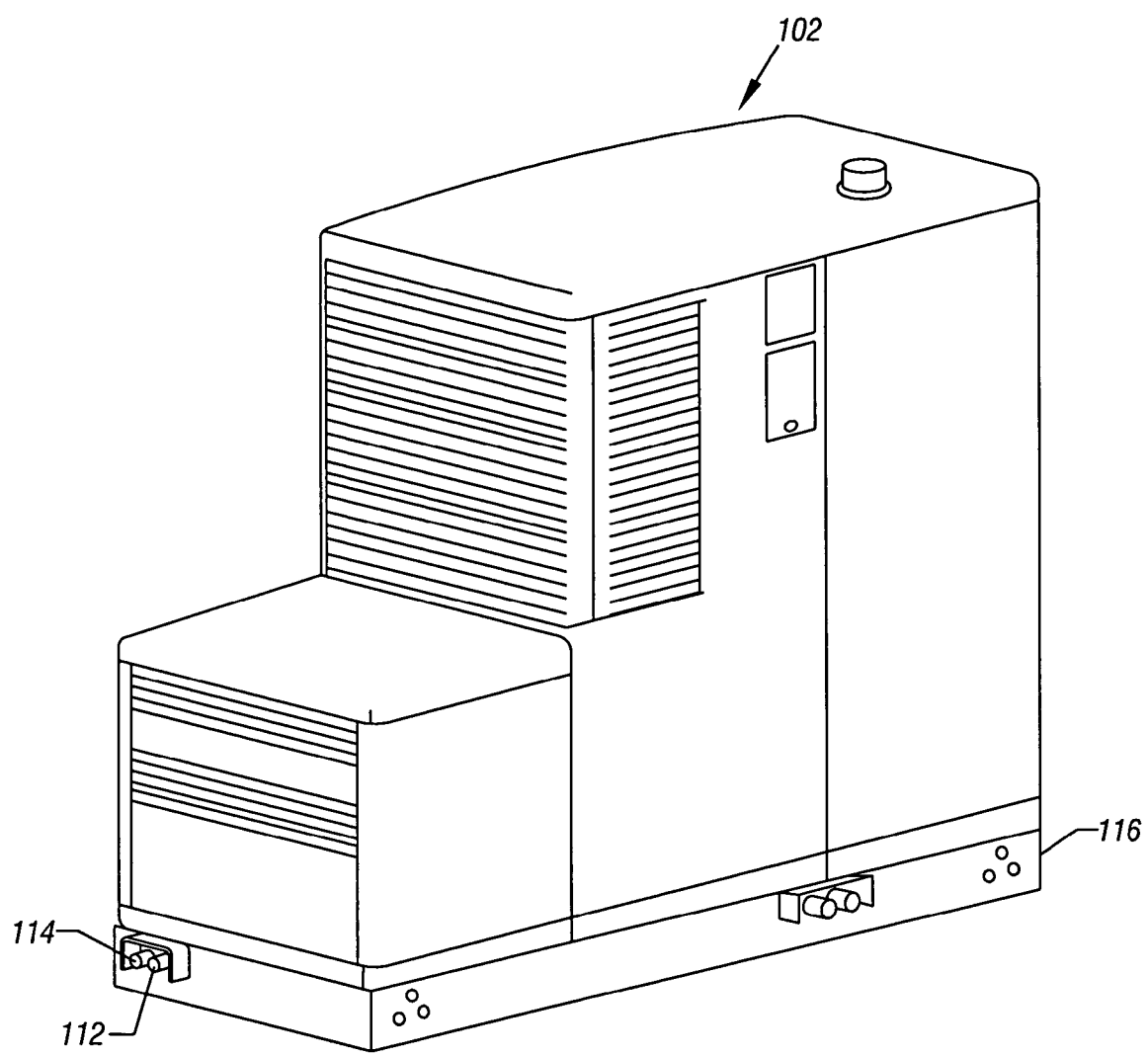
FIG. 2 shows a perspective view of a fuel cell system according to an embodiment of the present invention.

Referring to FIG. 2, the enclosure 102 comprises a frame 116, and the second input connector 114 and the outlet connector 112 are each located along a portion of the frame 116.

Figure 3:
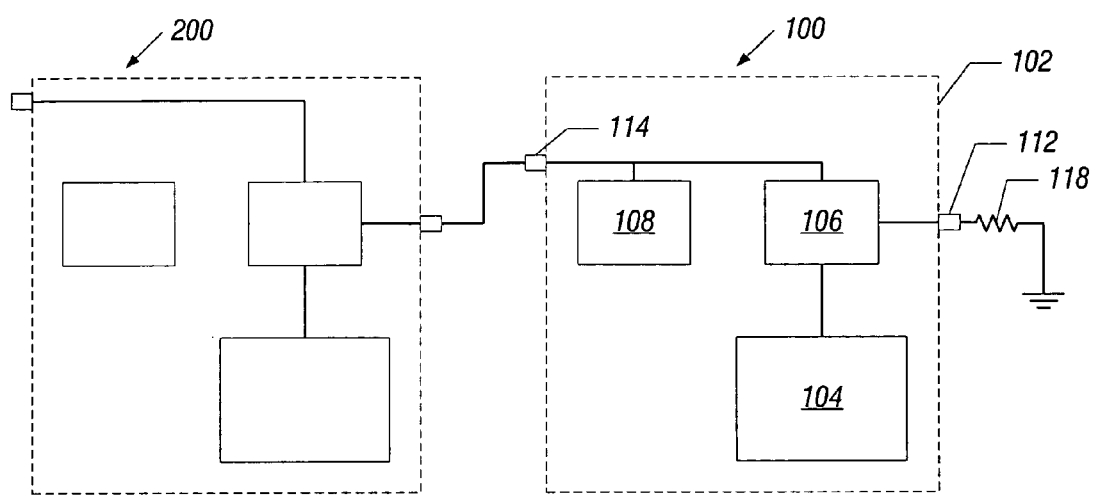
FIG. 3 shows a schematic diagram of a fuel cell system according to an embodiment of the present invention.

Referring to FIG. 3, system 100 is shown connected to another system 200. An electrical load 118 is coupled to the outlet connector 112 of system 100, and a second fuel cell system 200 is coupled to the second input connector 114 of system 100 such that power from the second fuel cell system 200 is supplied to the electrical load 118. The systems 100 and 200 are referred to as being connected in series (though the current from systems 100 and 200 may not necessarily be connected to load 118 in series), or in a "daisy chain" arrangement, referring to an arrangement where the output of one system is routed to an input of another system (and so on), such that a user can utilize all of the systems in the chain without needing to interface with each system individually.

Within power conditioning circuit 106, the outlet connector 112 is coupled to the second input connector 114 in parallel with the first input connector 110. For example, system 200 is designed to be used with system 100 and therefore provides raw unconditioned current to system 100 that is conditioned in power conditioning circuit 106. In some embodiments, the system 200 might have its own power conditioning circuit and therefore would supply system 100 with conditioned power that would be supplied to load 118 in parallel with conditioned power from power conditioning circuit 106.

In some embodiments, the controller 108 is adapted to determine the condition of power received from connector 114, and to route such current directly to load 118 or to power conditioning circuit 106 as needed. For example, if the current received from connector 114 has a voltage within a predetermined range (e.g., within 5% of 120 volts), then the controller 108 would route the current from connector 114 directly to load 118.

Figure 4:
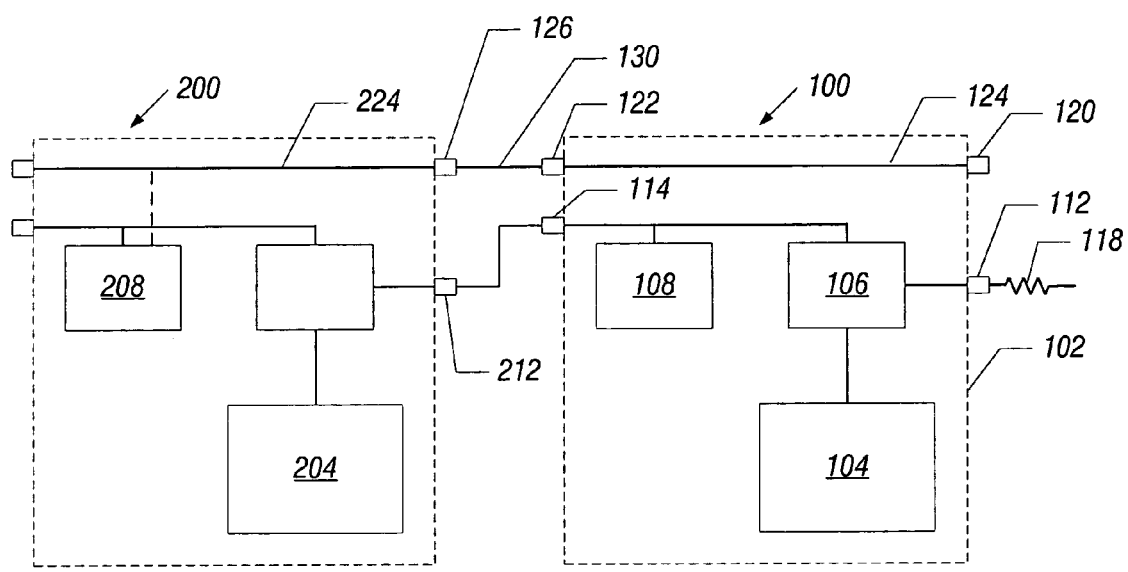
FIG. 4 shows a schematic diagram of a fuel cell system according to an embodiment of the present invention.

Referring to FIG. 4, system 100 is shown connected to another system 200. A communications bus 124 is coupled to the control circuit 108. The communications bus 124 has a first port 120 and a second port 122 (e.g., telephone or network style connectors), which allow the communications bus 124 to be placed in a daisy chain of communication busses of external fuel cell systems such as system 200. As shown in FIG. 4, and communications outlet 126 of system 200 is coupled to system 100 via connector 122. Through this communications link, the control circuit 108 can be adapted to modulate the power output of each system independently via signals communicated between the systems 100 and 200.

The systems illustrated in FIG. 4 can also be discussed in terms of a method for operating a plurality of fuel cell systems to supply a common electrical load. For example, such a method might include the following steps: (1) operating a first fuel cell stack 104 to supply a first amount of power onto a first system power bus 112; (2) operating a second fuel cell stack 204 to produce a second amount of power onto a second system power bus 212; (3) coupling the first and second system power buses 112 and 212 in series to an electrical load 118; (4) coupling a first control circuit 108 associated with the first fuel cell stack 104 to a first communications bus 124; (5) coupling a second control circuit 208 associated with the second fuel cell stack 204 to a second communications bus 224; (6) coupling the first and second communications busses 124 and 224 in series to an external communication line 130; and (7) operating each of the first and second control circuits 108 and 208 independently according to an external control circuit communicating via the external communications line 130.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:
    an enclosure housing a fuel cell stack, a power conditioning circuit, and a control circuit;
    wherein the power conditioning circuit has a first input connector electrically coupled to the fuel cell stack, wherein the power conditioning circuit is adapted to convert a direct current flow from the fuel cell stack to a conditioned alternating current flow having a predetermined voltage, wherein the conditioned current flow is provided to an outlet connector of the power conditioning circuit located along a first portion of the enclosure, wherein the power conditioning circuit further includes a second input connector located along a second portion of the enclosure, the second input connector being adapted to receive an external current flow; and
    wherein the control circuit is coupled to the second input connector, wherein the control circuit is adapted to operate the power conditioning circuit in a first mode when an external current flow is received by the second input connector, and wherein the control circuit is adapted to operate the power conditioning circuit in a second mode when an external current flow is not received by the second input connector.

2. The system of claim 1, wherein the enclosure comprises a frame, and wherein the second input connector and the outlet connector are each located along a portion of the frame.

3. The system of claim 1, further comprising:
    an electrical load coupled to the outlet connector; and
    a second fuel cell system coupled to the second input connector such that power from the second fuel cell system is supplied to the electrical load.

4. The system of claim 1, wherein the predetermined voltage is in the range of 110–120 volts.

5. The system of claim 1, wherein the controller is adapted to route current from the second input connector to the outlet connector when the current supplied to the second input connector has a predetermined voltage.

6. The system of claim 1, wherein the first mode includes operating the power conditioning circuit to condition the current received from the second input connector.

7. The system of claim 1, wherein the second mode includes electrically isolating the second input connector from the outlet connector.

8. The system of claim 1, further comprising:
a communications bus coupled to the control circuit, the communications bus having a first port and a second port, the first and second ports being adapted to allow the communications bus to be placed in a daisy chain of communication busses of external fuel cell systems.

9. The system of claim 8, wherein the control circuit is adapted to modulate a power output of the system according to a signal received from the communications bus.

10. A fuel cell system, comprising:
an enclosure housing a fuel cell stack and a power conditioning circuit;
wherein the power conditioning circuit has a first input connector, a second input connector, and an outlet connector; and
wherein the first input connector is electrically coupled to the fuel cell stack, wherein the second input connector is located along a first portion of the enclosure and is adapted to receive an external current flow, wherein the power conditioning circuit is adapted to convert a direct current flow from the first and second input connectors to a conditioned alternating current flow having a predetermined voltage, wherein the conditioned current flow is provided to an outlet connector of the power conditioning circuit located along a second portion of the enclosure.

11. The system of claim 10, wherein the enclosure comprises a frame, and wherein the second input connector and the outlet connector are each located along a portion of the frame.

12. The system of claim 10, further comprising:
an electrical load coupled to the outlet connector; and
a second fuel cell system coupled to the second input connector such that power from the second fuel cell system is supplied to the electrical load.

13. The system of claim 10, further comprising:
a communications bus coupled to the control circuit, the communications bus having a first port and a second port, the first and second ports being adapted to allow the communications bus to be placed in a daisy chain of communication busses of external fuel cell systems.

14. The system of claim 13, wherein the control circuit is adapted to modulate a power output of the system according to a signal received from the communications bus.

15. A fuel cell system, comprising:
an enclosure housing a fuel cell stack and a power conditioning circuit;
wherein the power conditioning circuit has a first input connector, a second input connector, and an outlet connector; and
wherein the first input connector is electrically coupled to the fuel cell stack, wherein the second input connector is located along a first portion of the enclosure and is adapted to receive an external current flow, wherein the power conditioning circuit is adapted to convert a direct current flow from the first connector to a conditioned alternating current flow having a predetermined voltage, wherein the conditioned current flow is combined with the external current flow and provided to an outlet connector of the power conditioning circuit located along a second portion of the enclosure.

16. The system of claim 15, wherein the enclosure comprises a frame, and wherein the second input connector and the outlet connector are each located along a portion of the frame.

17. The system of claim 15, further comprising:
an electrical load coupled to the outlet connector;
a second fuel cell system coupled to the second input connector such that power from the second fuel cell system is supplied to the electrical load.

18. The system of claim 15, further comprising:
a communications bus coupled to the control circuit, the communications bus having a first port and a second port, the first and second ports being adapted to allow the communications bus to be placed in a daisy chain of communication busses of external fuel cell systems.

19. The system of claim 18, wherein the control circuit is adapted to modulate a power output of the system according to a signal received from the communications bus.

20. A fuel cell system, comprising:
an enclosure housing a fuel cell stack and a power conditioning circuit;
wherein the power conditioning circuit is adapted to convert a direct current flow from the fuel cell stack to a conditioned alternating current flow having a predetermined voltage, wherein the conditioned current flow is supplied to a power outlet connector located along a first portion of the enclosure, wherein an electrical load is coupled to the power outlet connector; and
wherein the power outlet connector is coupled to a power input connector located along a second portion of the enclosure such that the conditioned current flow is supplied to the electrical load in series with an external power source coupled to the power input connector.

21. The system of claim 20, further comprising:
a control circuit coupled to a communications bus, the communications bus having a first port and a second port, the first and second ports being adapted to allow the communications bus to be placed in a daisy chain of communication busses of external fuel cell systems.

22. The system of claim 21, wherein the control circuit is adapted to modulate a power output of the system according to a signal received from the communications bus.

23. A method of operating a plurality of fuel cell systems to supply a common electrical load, comprising:
operating a first fuel cell stack to supply a first amount of power onto a first system power bus;
operating a second fuel cell stack to produce a second amount of power onto a second system power bus;
coupling the first and second system power buses in series to an electrical load;
coupling a first control circuit associated with the first fuel cell stack to a first communications bus;
coupling a second control circuit associated with the second fuel cell stack to a second communications bus;
coupling the first and second communications busses in series to an external communication line; and
operating each of the first and second control circuits independently according to an external control circuit communicating via the external communications line.

24. An apparatus comprising:
a housing;
an input connector being attached to the housing;
an output connector being attached to the housing to provide output power;
a fuel cell located in the housing and comprising an output terminal; and
a power conditioning circuit located in the housing and adapted to condition power received from the output terminal of the fuel cell in a first mode of operation to produce the output power and condition power received from the input connector in a second mode of operation to produce the output power.

25. The apparatus of claim 24, further comprising:
a fuel cell stack located inside the housing, wherein the fuel cell is part of the fuel cell stack.

26. The apparatus of claim 24 wherein the power received by the power conditioning circuit comprises direct current power and the power conditioning circuit is adapted to convert the direct current power into alternating current power.

27. The apparatus of claim 24, wherein the input connector is adapted to provide alternating current power, and the fuel cell is adapted to provide direct current power.

28. The apparatus of claim 24, further comprising a control circuit to selectively bypass the power conditioning circuit in response to a voltage received from the input connector being within a predetermined range.

29. A system comprising:
an input connector;
an output connector to provide output power for a load of the system;
a fuel cell comprising an output terminal; and
a power conditioning circuit adapted to condition power received from the output terminal of the fuel cell in a first mode of operation to produce the output power and condition power received from the input connector in a second mode of operation to produce the output power.

30. The system of claim 29, further comprising a control circuit to selectively bypass the power conditioning circuit in response to a voltage received from the input connector being within a predetermined range.

31. The system of claim 29, further comprising a control circuit to detect when the input connector is communicating power and selectively place the power conditioning circuit in one of the first mode and the second mode in response to the detection.

32. A method usable with a fuel cell, comprising:
disposing the fuel cell and a power conditioning circuit inside a housing;
automatically determining whether a source external to the housing is supplying power to a connector that is attached to the housing; and
based on the determination, placing the power conditioning circuit in one of a first mode of operation in which the power conditioning circuit conditions power from the fuel cell and a second mode of operation in which the power conditioning circuit conditions the power supplied by the source.

33. The method of claim 32, further comprising:
disposing a fuel cell stack inside the housing, wherein the fuel cell is part of the fuel cell stack.

34. The method of claim 32, further comprising:
attaching another connector to the housing to provide output power from the power conditioning circuit.

* * * * *